Patented June 2, 1925.

1,540,733

UNITED STATES PATENT OFFICE.

JAMES BADDILEY AND WILLIAM WYNDHAM TATUM, OF MANCHESTER, ENGLAND, ASSIGNORS TO BRITISH DYESTUFFS CORPORATION LIMITED, OF MANCHESTER, ENGLAND.

DYESTUFFS OF THE ANTHRAQUINONE SERIES.

No Drawing.     Application filed October 22, 1924. Serial No. 745,233.

*To all whom it may concern:*

Be it known that we, JAMES BADDILEY and WILLIAM WYNDHAM TATUM, subjects of the King of England, and residents of Manchester, in the county of Lancashire, England, have invented certain new and useful Improvements in Dyestuffs of the Anthraquinone Series, of which the following is a specification.

We have discovered that new and valuable acid dyes of the anthraquinone series are formed when a suitable aminoanthraquinone is condensed with a carboxylic acid of an alkylene oxide. The condensation can be effected in glacial acetic acid solution with or without the addition of a catalyst such as copper, the condensation product being then converted into a sodium or potassium salt. The new dyestuffs are distinguished particularly by the fact that they dye wool in extraordinarily bright shades having good general fastness properties. In addition they are applicable to the dyeing of acetyl silk. Their probable constitution may be represented as

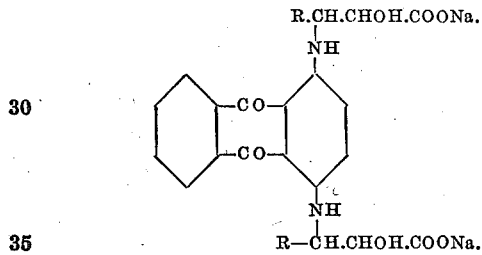

In this formula the symbol "R" indicates hydrogen, methyl, phenyl or substituted phenyl residues.

*Example.*

23.8 parts of 1.4 diaminoanthraquinone and 50 parts of the potassium salt of phenylglycidic acid

cook in 190 parts of glacial acetic acid are stirred together for one day at 20° C. After removal of the solvent and conversion into the sodium or potassium salt the dyestuff solution is filtered from insoluble matter and salted out in the usual way. It dyes wool in a very bright shade of blue.

The condensation appears to be most readily effected with 1.4-diaminoanthraquinone but other aminoanthraquinones can be used, for instance, α-aminoanthraquinone gives a red dyestuff and α-amino-4-hydroxy-anthraquinone a purple color and tetra-aminoanthraquinone gives a greenish-blue.

Our new dyestuffs are condensation products of carboxylic acids of alkylene oxides. They are sufficiently soluble in water to be readily usable in the acid dyebath for dyeing wool on which they yield bright shades fast to milling and with good general fastness properties. On acidifying an aqueous solution the dyes are precipitated. A solution in strong sulfuric acid is brown to red-brown and the color is destroyed on warming. The specific coloring matter obtained according to the foregoing example is a dark powder, insoluble in most organic solvents and soluble in water with a blue color. The aqueous solution gives a blue precipitate on acidification. The color in glacial acetic acid is blue. A solution in strong sulfuric acid is red-brown and the color is destroyed on warming.

Now what we claim is:—

1. As new articles of manufacture the new dyestuffs which are condensation products of diaminoanthraquinones and a carboxylic acid of an alkylene oxide.

2. As new articles of manufacture the new dyestuffs which are condensation products of diaminoanthraquinones with phenyl glycidic acid, which are soluble in water and dye wool giving bright shades fast to milling with good general fastness properties.

3. As a new article of manufacture the new dyestuffs, which is a condensation product of 1.4-diaminoanthraquinone with phenyl glycidic acid which is soluble in the dyebath and dyes wool from the acid bath giving brilliant blue shades fast to milling and having good general fastness properties.

In testimony whereof we have hereunto affixed our signatures.

JAMES BADDILEY.
WILLIAM WYNDHAM TATUM.

Certificate of Correction.

It is hereby certified that in Letters Patent No. 1,540,733, granted June 2, 1925, upon the application of James Baddiley and William Wyndham Tatum, of Manchester, England, for an improvement in "Dyestuffs of the Anthraquinone Series," errors appear in the printed specification requiring correction as follows: Page 1, strike out lines 45 and 46, comprising the symbols, and insert instead $$C_6H_5.CH.CH.COOK \atop \diagdown O \diagup$$

and line 47, strike out the word "cook"; and that the said Letters Patent should be read with these corrections therein that the same may conform to the record of the case in the Patent Office.

Signed and sealed this 21st day of July, A. D. 1925.

[SEAL.]

KARL FENNING,
*Acting Commissioner of Patents.*